United States Patent
Sewall et al.

(10) Patent No.: US 8,477,639 B2
(45) Date of Patent: Jul. 2, 2013

(54) COMMUNICATING NETWORK STATUS

(75) Inventors: Patrick Sewall, Boise, ID (US); David Alan Johnson, Boise, ID (US); Steven Wood, Boise, ID (US)

(73) Assignee: Cradlepoint, Inc., Boise, ID (US)

( * ) Notice: Subject to any disclaimer, the term of this patent is extended or adjusted under 35 U.S.C. 154(b) by 1207 days.

(21) Appl. No.: 12/350,402

(22) Filed: Jan. 8, 2009

(65) Prior Publication Data

US 2009/0180395 A1 Jul. 16, 2009

Related U.S. Application Data

(63) Continuation-in-part of application No. 10/936,124, filed on Sep. 8, 2004, now Pat. No. 7,764,784.

(60) Provisional application No. 61/019,775, filed on Jan. 8, 2008, provisional application No. 61/019,874, filed on Jan. 9, 2008.

(51) Int. Cl.
*H04J 1/16* (2006.01)

(52) U.S. Cl.
USPC ............................ 370/252; 455/440; 709/224

(58) Field of Classification Search
USPC ................ 370/241–252, 328, 338, 346, 449; 709/223–225, 229; 455/404.2, 440, 456.1–456.6
See application file for complete search history.

(56) References Cited

U.S. PATENT DOCUMENTS

| | | | |
|---|---|---|---|
| 5,231,633 A | 7/1993 | Hluchyj et al. | |
| 5,594,946 A | 1/1997 | Menich et al. | |
| 5,638,359 A | 6/1997 | Peltola et al. | |
| 5,859,628 A | 1/1999 | Ross et al. | |
| 5,864,539 A | 1/1999 | Yin | |
| 6,006,034 A | 12/1999 | Heath et al. | |
| 6,006,264 A | 12/1999 | Colby et al. | |
| 6,028,848 A | 2/2000 | Bhatia et al. | |
| 6,031,844 A | 2/2000 | Lin | |
| 6,377,825 B1 | 4/2002 | Kennedy et al. | |
| 6,389,462 B1 | 5/2002 | Cohen et al. | |
| 6,434,187 B1 | 8/2002 | Beard et al. | |
| 6,535,592 B1 | 3/2003 | Snelgrove | |

(Continued)

FOREIGN PATENT DOCUMENTS

| | | |
|---|---|---|
| EP | 1331784 A1 | 7/2003 |
| JP | 20010186565 | 7/2001 |
| KR | 20040028099 | 4/2004 |

OTHER PUBLICATIONS

US Patent and Trademark Office, Office Action, U.S. Appl. No. 12/172,862, dated Jul. 27, 2011.

(Continued)

*Primary Examiner* — Kan Yuen
(74) *Attorney, Agent, or Firm* — Parsons Behle & Latimer

(57) ABSTRACT

A method for communicating network status information includes receiving, via a first link, a request for status information from a client device, the first link being a link between a router device and a client device. In response to the request, a data exchanger is polled for status information via a second link. The second link is a link between the router device and the data exchanger. The status information identifies a state of a third link between the data exchanger and a wide area network. The status information is received via the second link and communicated to the client device via the first link.

15 Claims, 7 Drawing Sheets

U.S. PATENT DOCUMENTS

| | | |
|---|---|---|
| 6,553,028 B1 | 4/2003 | Tang |
| 6,560,442 B1 | 5/2003 | Yost et al. |
| 6,609,197 B1 | 8/2003 | Ketcham et al. |
| 6,611,861 B1 | 8/2003 | Schairer et al. |
| 6,615,262 B2 | 9/2003 | Schweitzer et al. |
| 6,735,447 B1 | 5/2004 | Muller |
| 6,795,700 B2 | 9/2004 | Karaoguz et al. |
| 6,850,495 B1 | 2/2005 | Baum et al. |
| 6,862,444 B2 | 3/2005 | Karaoguz et al. |
| 6,885,859 B2 | 4/2005 | Karaoguz et al. |
| 6,967,958 B2 | 11/2005 | Ono et al. |
| 6,987,726 B1 | 1/2006 | Elliott |
| 7,009,941 B1 | 3/2006 | Uchino |
| 7,095,335 B2 | 8/2006 | De Bolster et al. |
| 7,187,923 B2 | 3/2007 | Mousseau et al. |
| 7,213,478 B2 | 5/2007 | Harada et al. |
| 7,317,896 B1 | 1/2008 | Saxena et al. |
| 7,346,344 B2 | 3/2008 | Fontaine |
| 7,382,771 B2 | 6/2008 | Leblanc et al. |
| 7,400,903 B2 | 7/2008 | Shoemake et al. |
| 7,421,265 B1 | 9/2008 | Liu |
| 7,558,199 B1 * | 7/2009 | Minei et al. .................. 370/230 |
| 7,617,317 B2 | 11/2009 | Jones et al. |
| 7,620,065 B2 | 11/2009 | Falardeau |
| 7,675,862 B2 | 3/2010 | Pham et al. |
| 7,764,784 B2 | 7/2010 | Sewall |
| 7,813,314 B2 | 10/2010 | Fulknier et al. |
| 2001/0039580 A1 | 11/2001 | Walker et al. |
| 2001/0042215 A1 | 11/2001 | Sullivan et al. |
| 2001/0046870 A1 | 11/2001 | Stilp et al. |
| 2001/0048683 A1 | 12/2001 | Allan |
| 2002/0025832 A1 | 2/2002 | Durian et al. |
| 2002/0062372 A1 | 5/2002 | Hong et al. |
| 2002/0118663 A1 | 8/2002 | Dorenbosch et al. |
| 2003/0037165 A1 | 2/2003 | Shinomiya |
| 2003/0043755 A1 | 3/2003 | Mitchel |
| 2003/0045295 A1 | 3/2003 | Stanforth |
| 2003/0046396 A1 | 3/2003 | Richter et al. |
| 2003/0059005 A1 | 3/2003 | Meyerson et al. |
| 2003/0126252 A1 | 7/2003 | Abir |
| 2003/0200308 A1 | 10/2003 | Tameda et al. |
| 2003/0212800 A1 | 11/2003 | Jones et al. |
| 2003/0235175 A1 | 12/2003 | Naghian et al. |
| 2004/0003071 A1 | 1/2004 | Mathew et al. |
| 2004/0038697 A1 | 2/2004 | Attar et al. |
| 2004/0049576 A1 | 3/2004 | Schweitzer et al. |
| 2004/0068502 A1 | 4/2004 | Vogedes |
| 2004/0110544 A1 | 6/2004 | Oyagi et al. |
| 2004/0133689 A1 | 7/2004 | Vasisht |
| 2004/0133793 A1 | 7/2004 | Ginter et al. |
| 2004/0139170 A1 | 7/2004 | Shen et al. |
| 2004/0152449 A1 | 8/2004 | Koshihara |
| 2004/0153676 A1 | 8/2004 | Krantz et al. |
| 2004/0185876 A1 | 9/2004 | Gorenendaal et al. |
| 2004/0205154 A1 | 10/2004 | Dalton et al. |
| 2004/0205155 A1 | 10/2004 | Nobakht et al. |
| 2004/0218544 A1 | 11/2004 | Lee |
| 2004/0250136 A1 | 12/2004 | Albertine Trappeniers et al. |
| 2005/0008017 A1 | 1/2005 | Datta et al. |
| 2005/0014525 A1 | 1/2005 | Tsunehara et al. |
| 2005/0022013 A1 | 1/2005 | Schwenk |
| 2005/0038905 A1 | 2/2005 | Banes et al. |
| 2005/0101340 A1 | 5/2005 | Archiable |
| 2005/0108573 A1 | 5/2005 | Bennett et al. |
| 2005/0198234 A1 | 9/2005 | Leib et al. |
| 2005/0198319 A1 | 9/2005 | Chan et al. |
| 2005/0221850 A1 | 10/2005 | Kashiwase |
| 2005/0233728 A1 | 10/2005 | Karaoguz et al. |
| 2005/0245233 A1 | 11/2005 | Anderson |
| 2005/0246434 A1 | 11/2005 | Bantz et al. |
| 2005/0259645 A1 | 11/2005 | Chen et al. |
| 2005/0259654 A1 | 11/2005 | Faulk, Jr. |
| 2005/0262248 A1 | 11/2005 | Jennings, III et al. |
| 2005/0267965 A1 | 12/2005 | Heller |
| 2006/0047823 A1 | 3/2006 | Cheng |
| 2006/0053290 A1 | 3/2006 | Randle |
| 2006/0072474 A1 | 4/2006 | Mitchell |
| 2006/0077607 A1 | 4/2006 | Hendricks et al. |
| 2006/0133582 A1 | 6/2006 | McCulloch |
| 2006/0153216 A1 | 7/2006 | Hosein et al. |
| 2006/0171402 A1 | 8/2006 | Moore et al. |
| 2006/0184670 A1 | 8/2006 | Beeson et al. |
| 2006/0187890 A1 | 8/2006 | Lin |
| 2007/0002846 A1 | 1/2007 | Rada et al. |
| 2007/0030857 A1 | 2/2007 | Fulknier et al. |
| 2007/0081469 A1 | 4/2007 | Tracy et al. |
| 2007/0083606 A1 | 4/2007 | Malik et al. |
| 2007/0147324 A1 | 6/2007 | McGary |
| 2007/0153689 A1 | 7/2007 | Strub et al. |
| 2007/0177555 A1 * | 8/2007 | Brueck et al. .................. 370/338 |
| 2007/0233879 A1 | 10/2007 | Woods et al. |
| 2007/0254727 A1 | 11/2007 | Sewall |
| 2007/0255848 A1 * | 11/2007 | Sewall et al. .................. 709/232 |
| 2007/0291711 A1 | 12/2007 | Welch et al. |
| 2008/0005108 A1 | 1/2008 | Ozzie et al. |
| 2008/0008165 A1 | 1/2008 | Ikeda et al. |
| 2008/0039102 A1 | 2/2008 | Sewall |
| 2008/0043626 A1 | 2/2008 | Pham et al. |
| 2008/0043673 A1 | 2/2008 | Johnson et al. |
| 2008/0046561 A1 | 2/2008 | Pham et al. |
| 2008/0049630 A1 | 2/2008 | Kozisek et al. |
| 2008/0056222 A1 | 3/2008 | Waites |
| 2008/0117860 A1 | 5/2008 | Rodriguez et al. |
| 2008/0159167 A1 | 7/2008 | Ito et al. |
| 2008/0178172 A1 | 7/2008 | Dossa et al. |
| 2008/0259841 A1 | 10/2008 | Deshpande |
| 2008/0310407 A1 | 12/2008 | Sewall |
| 2008/0313327 A1 | 12/2008 | Sewall et al. |
| 2009/0007096 A1 | 1/2009 | Chavez et al. |
| 2009/0015419 A1 | 1/2009 | Sewall |
| 2009/0129319 A1 | 5/2009 | Buddhikot et al. |
| 2009/0138447 A1 | 5/2009 | Kalavade |
| 2009/0147700 A1 | 6/2009 | Sewall |
| 2009/0168789 A1 | 7/2009 | Wood |
| 2009/0172658 A1 | 7/2009 | Wood |
| 2009/0172796 A1 | 7/2009 | Wood |
| 2009/0175285 A1 | 7/2009 | Wood et al. |
| 2009/0180395 A1 | 7/2009 | Wood et al. |
| 2009/0182845 A1 | 7/2009 | Johnson |
| 2009/0207003 A1 | 8/2009 | Brekke et al. |
| 2010/0014415 A1 | 1/2010 | Moeller |
| 2010/0118846 A1 | 5/2010 | Moeller |
| 2010/0202450 A1 | 8/2010 | Ansari et al. |
| 2010/0231790 A1 | 9/2010 | Ansari et al. |
| 2011/0051703 A1 | 3/2011 | Fulknier et al. |
| 2011/0167157 A1 | 7/2011 | Virgilio et al. |
| 2011/0199932 A1 | 8/2011 | Short et al. |

OTHER PUBLICATIONS

US Patent and Trademark Office, Final Office Action, U.S. Appl. No. 11/673.965, dated Aug. 4, 2011.

US Patent and Trademark Office, Office Action, U.S. Appl. No. 11/673,956, dated Aug. 10, 2011.

US Patent and Trademark Office, Office Action, U.S. Appl. No. 12/350,407, dated Jul. 6, 2011.

US Patent and Trademark Office, Final Office Action, U.S. Appl. No. 12/270,419, dated Jul. 11, 2011.

USPTO, "Office Action in U.S. Appl. No. 11/673,956 dated Dec. 22, 2010".

USPTO, "Final Office Action in U.S. Appl. No. 12/172,885 dated Nov. 2, 2010".

In Motion Technology—Take Your Business on the Road—Mobile Hotspot, "In Motion Technology, Inc. Introduces Industry's First 3G Hotspot for Passenger Productivity.", Jul. 31, 2003, Publisher: http://www.inmotiontechnology.com/newsevents/carey.html.

Mikrotik, "MikroTik Router OS V28 Reference Manual", 2005.

Peng, Dar-Tzen; Shin, K.G.; Abdelzaher, T.F., "Assignment and scheduling communicating periodic tasks in distributed real-time systems", Dec. 1997, Publisher: Software Engineering, IEEE Transactions on, vol. 23, No. 12, pp. 745-758, Dec. 1997.

USPTO, "Office Action in U.S. Appl. No. 12/270,419 dated Dec. 17, 2010".

USPTO, "Final Office Action in U.S. Appl. No. 12/350,407 dated Dec. 14, 2010".

USPTO, "Final Office Action in U.S. Appl. No. 10/936,124.", Feb. 2, 2007.
USPTO, "Final Office Action in U.S. Appl. No. 10/936,124.", Feb. 9, 2009.
USPTO, "Final Office Action in U.S. Appl. No. 10/936,124.", Jul. 11, 2007.
USPTO, "Final Office Action in U.S. Appl. No. 10/936,124.", Sep. 3, 2009.
USPTO, "Office Action in U.S. Appl. No. 10/936,124.", Apr. 10, 2008.
USPTO, "Office Action in U.S. Appl. No. 10/936,124.", Jun. 26, 2006.
Webster's, "Router", Aug. 28, 2009, Publisher: Webster's New World Telcom Dictionary 2009, Your Dictionary, www.yourdictionary.com/telecom/router.
USPTO, "Final Office Action in U.S. Appl. No. 11/673,965.", Apr. 1, 2010.
USPTO, "Office Action in U.S. Appl. No. 11/673,965.", Sep. 2, 2009.
USPTO, "Advisory Action in U.S. Appl. No. 11/376,973", Mar. 19, 2010.
R. Elz, R. Bush, "RFC 2181 Clarifications to the DNS Specification, Internet Engineering Task Force, http://tools.ietf.org/html/rfc2181, 1 page", Jul. 1997.
P. Vixie, S. Thomson, Y. Rekhter, J. Bound, "RFC 2136 Dynamic Updates in the Domain Name System (DNS Update), Internet Engineering Task Force, 51 pages.", Apr. 1997.
USPTO, "Final Office Action in U.S. Appl. No. 11/673,973.", Dec. 10, 2009.
USPTO, "Office Action in U.S. Appl. No. 11/673,973.", May 28, 2009.
Wikipedia, "Proxy Server, http://en.wikipedia.org/wiki/Proxy_server ; 9 pages,", Apr. 12, 2010.
USPTO, "Final Office Action in U.S. Appl. No. 11/673,956.", Apr. 15, 2010.
USPTO, "Office Action in U.S. Appl. No. 11/673,956.", Sep. 2, 2009.
USPTO, "Office Action in U.S. Appl. No. 12/172,885.", Apr. 26, 2010.
USPTO, "Office Action in U.S. Appl. No. 12/350,407.", Apr. 5, 2010.
PCT, "International Search Report & Written Opinion of the International Searching Authority for Application No. PCT/US2007/062077,", Nov. 20, 2007.
PCT, "International Search Report & Written Opinion of the International Searching Authority for Application No. PCT/US2007/062078,", Mar. 5, 2008.
PCT, "International Search Report & Written Opinion of the International Searching Authority for Application No. PCT/US2007/062079,", Nov. 8, 2007.
PCT, "International Search Report and Written Opinion of the International Searching Authority for Application No. PCT/US2008/076836,", Mar. 6, 2009.
PCT, "International Search Report and Written Opinion of the International Searching Authority for Application No. PCT/US2008/083409,", May 12, 2009.
USPTO, "Office Action in U.S. Appl. No. 11/673,973", Jun. 24, 2010.
USPTO, "Office Action in U.S. Appl. No. 12/172,862", Aug. 31, 2010.
USPTO, "Office Action in U.S. Appl. No. 11/673,965 dated Feb. 15, 2011".
USPTO, "Office Action in U.S. Appl. No. 12/172,862 dated Feb. 14, 2011".
US Patent and Trademark Office, Office Action, U.S. Appl. No. 12/350,405, dated Feb. 16, 2012.
US Patent and Trademark Office, Final Office Action dated Mar. 15, 2012 for U.S. Appl. No. 12/843,541.
US Patent and Trademark Office, Final Office Action for U.S. Appl. No. 12/350,407 dated Jan. 3, 2012.
US Patent and Trademark Office, Office Action for U.S. Appl. No. 12/351,502 dated Apr. 25, 2012.
Router; http://www.yourdictionary.com/telecom/router; Aug. 28, 2009.
US Patent and Trademark Office, Office Action for U.S. Appl. No. 12/843,541 dated Jul. 18, 2012.
US Patent and Trademark Office, Final Office Action for U.S. Appl. No. 12/172,862 date Apr. 24, 2012.
US Patent and Trademark Office; Office Action for U.S. Appl. No. 12/270,419 dated Mar. 27, 2012.

* cited by examiner

COMMUNICATING NETWORK STATUS

CROSS REFERENCE TO RELATED APPLICATIONS

This application claims the priority of provisional applications 61/019,775 entitled "Client Application Provides WAN Status" filed Jan. 8, 2008 and 61/019,874 entitled "Intelligent Switching Between Multiple Available WAN Connections" filed Jan. 9, 2008, which are both hereby incorporated by reference. This application is a continuation in part of application Ser. No. 10/936,124 entitled Device Cradle filed Sep. 8, 2004 now U.S. Pat. No. 7,764,784. Application Ser. No. 10/936,124 is incorporated herein by reference.

BACKGROUND

Routers allow client devices in a local area network (LAN) to access a wide area network (WAN). Links between client devices and the router may be wired or wireless. Similarly, links between the router and the Wide Area Network may be wired or wireless. Wireless links to the WAN may be through cellular network. While the user of a client device can usually discern the status of the link between the client device and the router, identifying the status of the link between the router and the WAN can prove more complicated. This is especially true with wireless WAN links.

For example, the strength and speed of a wireless cellular WAN link depends upon the router's proximity to a cell tower. When the router is in motion or changes location, the signal strength may change or become intermittent. However, the user cannot easily discern if problems caused by the intermittent link are the result of a poor WAN connection, a problem with the ISP, or a problem with the web site being accessed.

DETAILED DESCRIPTION

INTRODUCTION: Various embodiments described below operate to provide a client device with status information concerning a data link between a router device and a wider area network (WAN). Such can prove to be especially useful when the link between the router device and the WAN is wireless and prone to changes in signal strength and link speed. In a particular example, an application executed by the client device interacts with the router device to obtain and ultimately display the status information to a user.

Figure 1:
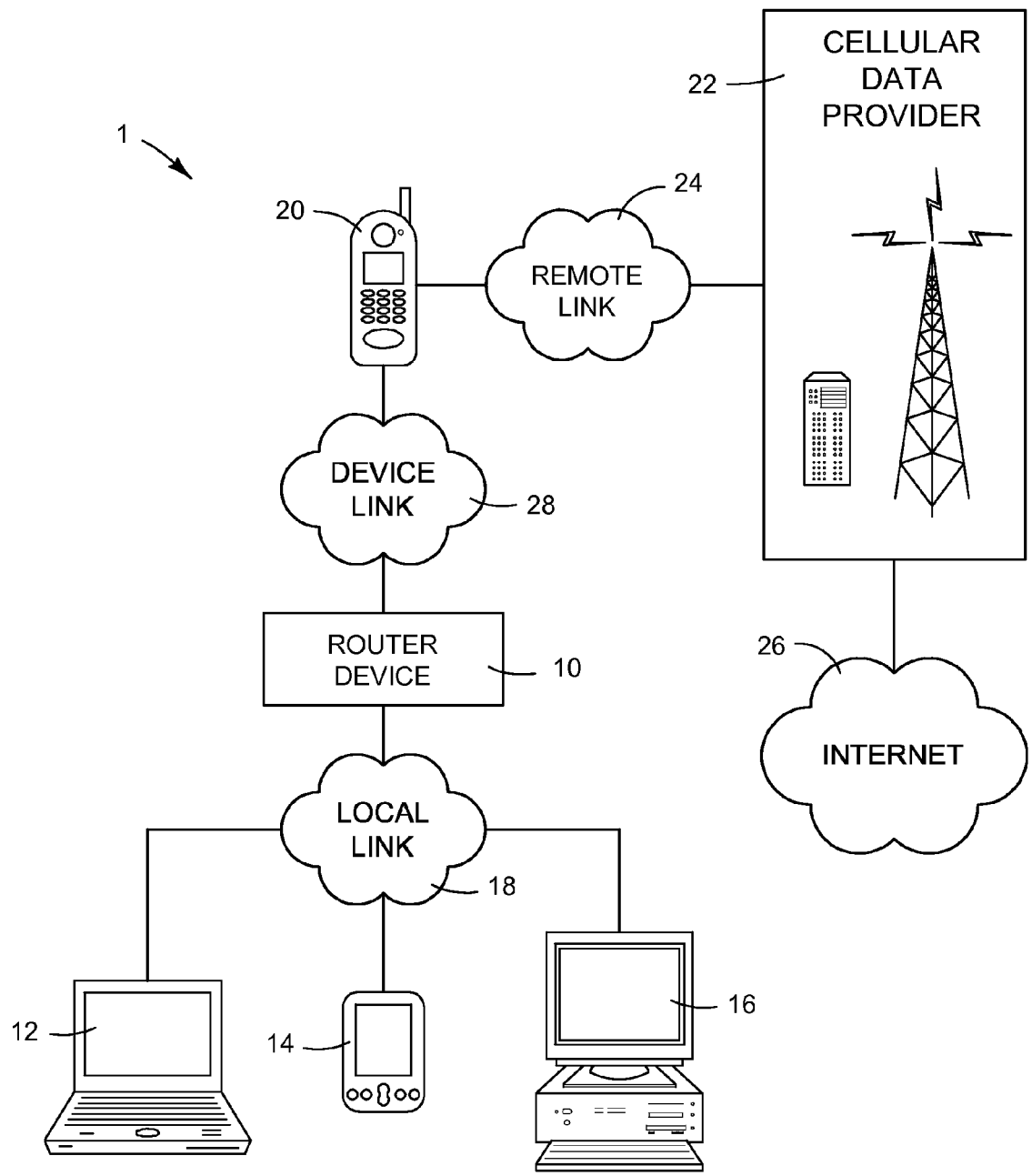
FIGS. 1-3 illustrate an exemplary block diagrams of environments in which embodiments of the present invention can be implemented.

ENVIRONMENT: FIG. 1 illustrates exemplary environment 1 in which various embodiments of the present invention may be implemented. Environment 1 includes router device 10 and clients 12, 14, and 16 and local link 18. Clients 12, 14, and 16 represent generally any computing devices capable of communicating with router device 10. Router device 10, discussed in more detail later, represents generally a device capable of connecting to clients 12, 14, and 16 and performing one or more tasks as guided by a connected client. In the following examples, router device is described as a router device. However, implementation of various embodiments is not so limited. For example, router device 10 could be a printer or a scanner.

Local link 18 interconnects router device 10 and clients 12, 14, 16. Local link 18 represents generally a cable, wireless, or remote link via a telecommunication link, an infrared link, a radio frequency link, or any other connector or system that provides electronic communication between devices 10, 12, 14, and 16. The path followed by link 18 between devices 10, 12, 14, and 16 in the schematic view of FIG. 1 represents the logical communication path between these devices, not necessarily the physical path between the devices. Devices 10, 12, 14, and 16 can be connected at any point and the appropriate communication path established logically between the devices.

Environment 1 also includes data exchanger 20 and service provider 22. Data exchanger 20 represents generally and combination of hardware and programming that can be utilized by router device 10 to connect to a remote network such as the internet. While illustrated as an internet enabled cellular telephone, data exchanger 20 is not so limited. Other examples include but are not limited to DSL modems and cable modems.

Service provider 22 represents generally any infrastructure configured to provide internet related data services to subscribers such as an owner of data exchanger 20. For example, where data exchanger 20 is an internet enabled cellular telephone, service provider 22 may be a cellular telephone service provider capable of providing voice and data services to subscribers allowing access to internet 26. Where data exchanger 22 is a DSL or cable modem, service provider 22 may be a more traditional internet service provider (ISP) providing data access to internet 26.

Remote link 24 is a data link that interconnects data exchanger 20 and service provider 22. Remote link 24 represents generally any combination of a cable, wireless, or remote connection via a telecommunication link, an infrared link, a radio frequency link, or any other connector or system that provides electronic communication between data exchanger 20 and service provider 22.

In the embodiment illustrated in environment 1, device link 28 interconnects router device 10 and data exchanger 20. Device link 28 represents generally any combination of a cable, wireless, or remote connection via a telecommunication link, an infrared link, a radio frequency link, or any other connector or system that provides electronic communication between devices 10 and 20. As examples, device link 28 may incorporate a physical USB cable or radio waves carrying communications of any one of a number of protocols such as Bluetooth.

Communication between clients 12, 14, and 16 and internet 26 is dependent upon router device 10. Router device 10, as discussed below with respect to FIGS. 3-6, includes components capable of distinguishing among the user's of clients 12, 14, and 16, and applying different internet access rules for different users.

Figure 2:
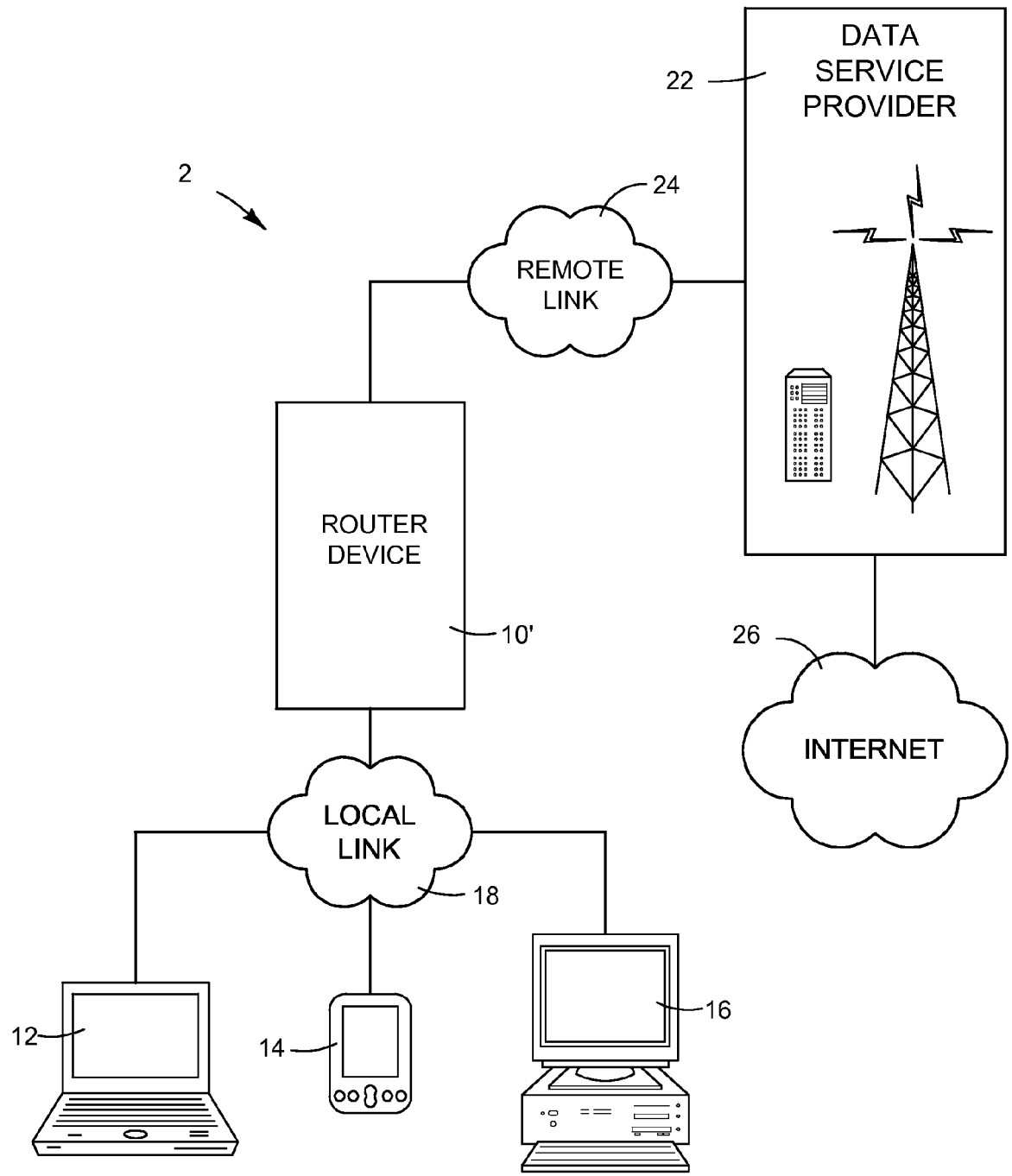

FIG. 2 illustrates exemplary environment 2 in which various embodiments of the present invention may be implemented. In the example of FIG. 2, data exchanger 20 (not shown) and router device 10' are incorporated within the same device. Device link 32 (shown in FIG. 1) is eliminated and replaced with internal connections. In such a scenario, data exchanger may take the form of a separate card that can be inserted into a slot provided by router device 10, or dongle connected to the router device 10 through an I/O port. Alternatively, data exchanger 20 may be fully integrated into router device 10. In any event, device link 28 (FIG. 1) while not apparent in FIG. 2 is internal to router device 10'.

Figure 3:
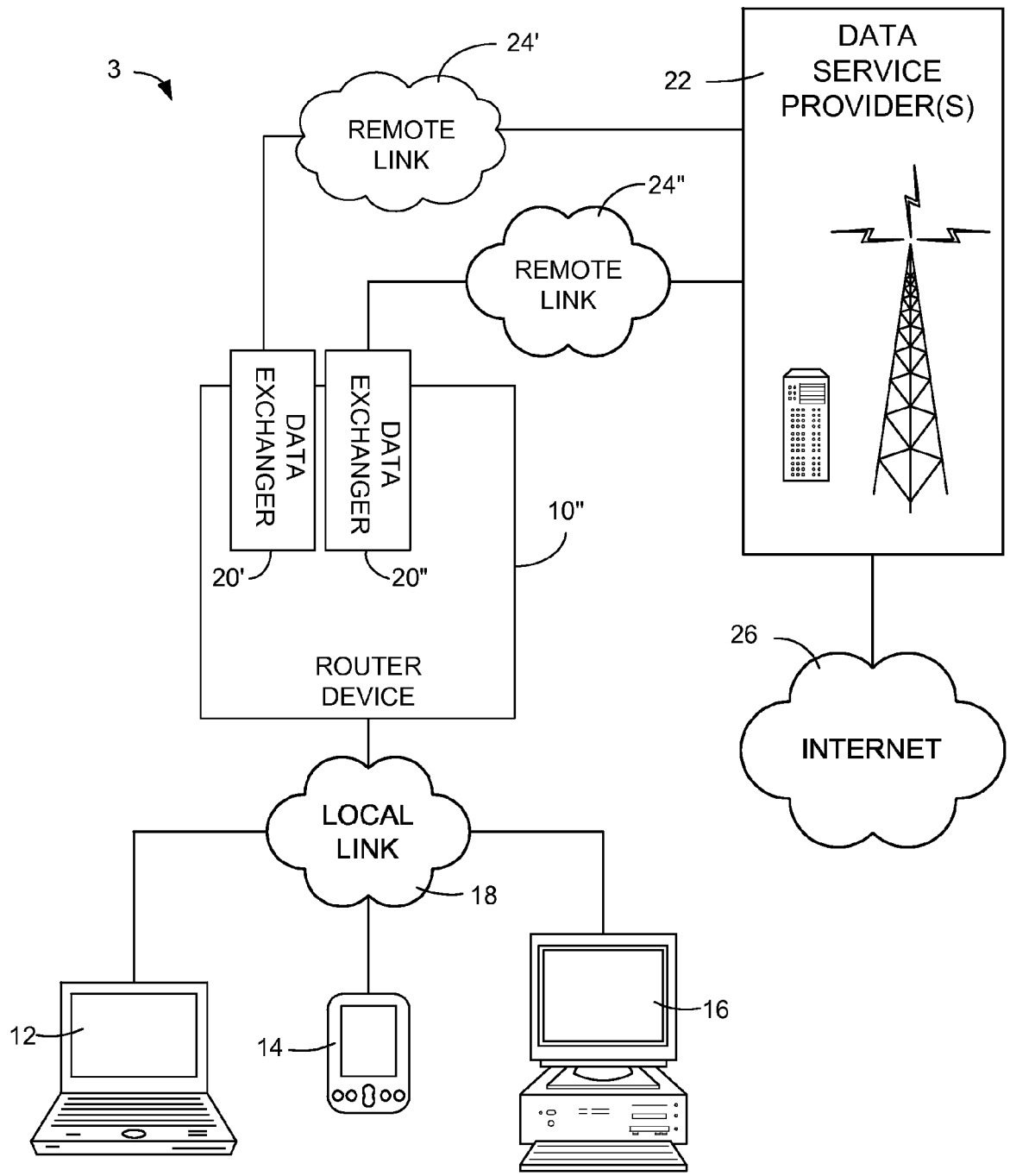

FIG. 3 illustrates exemplary environment 3 in which various embodiments may be implemented. In the example of FIG. 3, router device 10" is configured to utilize two data exchangers 10' and 10". In this manner two remote links 24' and 24" can be established with one or more data service providers 22, thus, establishing two separate paths for routing data communications between clients 12-16 and the internet 26. In FIG. 3, data exchangers 20' and 20" appear as dongles or cards connected to separate I/O ports of router device 10". In other examples, one data exchanger 10' or 10" may be a data enabled cellular telephone while the other may be a DSL or cable modem. Alternatively, one or both of data exchangers 20' and 20" may be fully integrated into router device 10. In any event, device link 28 (FIG. 1) while not apparent in FIG. 3 is internal to router device 10"

Figure 4:
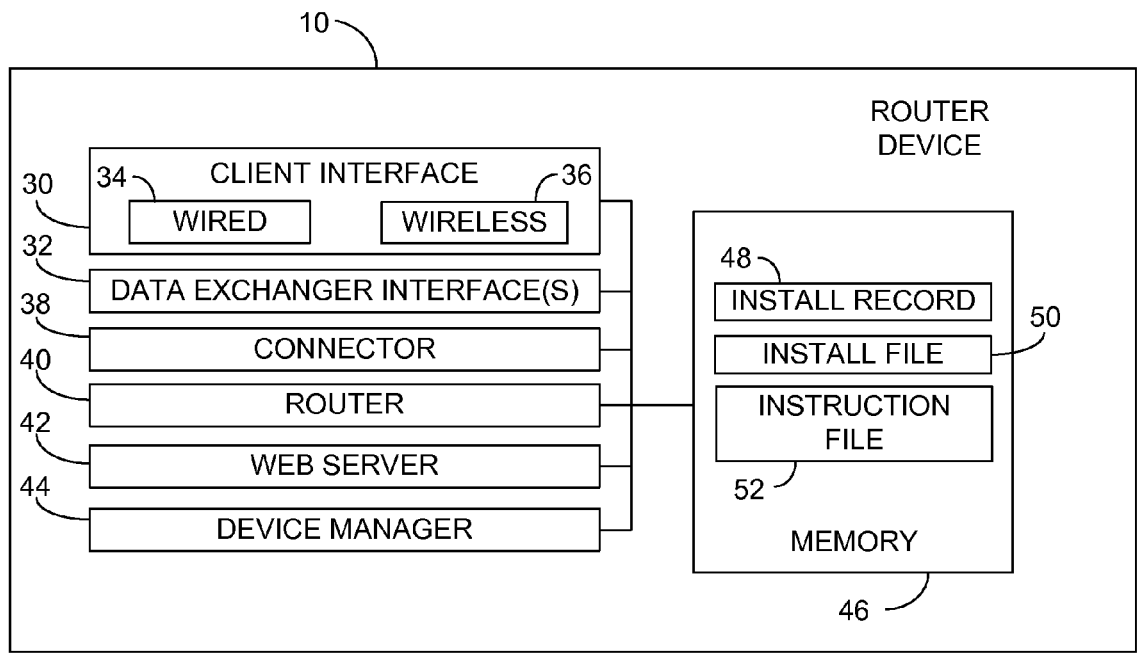
FIGS. 4-7 are block diagrams showing physical and logical components of a Router according to an embodiment of the present invention.

ROUTER DEVICE: FIG. 4 is a block diagram illustrating physical and logical components of router device 10. In this example, router device 10 represents generally any combination of hardware and programming capable routing network communications between clients on the local network and between the clients and the internet via a data exchanger such as an internet enabled cellular telephone, cellular data card or dongle, or DSL or cable modem. In the example of FIG. 3 router device 10 includes client interface 30 and data exchanger interface 32. Client interface 30 represents generally any combination of hardware and program instructions capable of supplying a communication interface between router device 10 and clients 12, 14, and 16 shown in FIGS. 1 and 2.

Data exchanger interface 32 represents any combination of hardware and programming enabling data to be communicated between router device 10 and one or more data exchangers 20, 20', and 20" shown in FIGS. 1 and 3. Client interface 30 is shown to include wired interface 34 and wireless interface 36. Wired interface 34 represents generally any interface through which communications can pass between router device 10 and clients 12, 14, and 16 via one or more physical wires. Wired interface 34 may include one or more serial or parallel ports including but not limited to USB and FireWire ports. Wireless interface 36 represents generally any interface through which information can be exchanged between router device 10 and clients 12, 14, and 16 via a wireless protocol such as ultrawideband (UWB), Bluetooth, or 802.11.

Router device 10 also includes connector 38, router 40, web server 42, device manager 44, and memory 46. Connector 38 represents generally any combination of hardware and programming for being used to send signals for controlling data exchangers of various types. In the example of FIG. 3, router device 10" utilizes data exchangers 20' and 20". Data exchangers 20' and 20" may be from different manufactures and may be designed to interact with different data service providers. Thus, connector 38 utilizes different signals for each data exchanger 20' and 20" to achieve the same result. Connector 40 is responsible sending appropriate signals to cause a data exchanger to establish a remote link with a data service provider so that access can be made to internet 26. Connector 40 is also responsible for sending signals to poll a data exchanger for status information identifying a state of the remote link between the data exchanger and a wider area network (WAN) represented by internet 26 in FIGS. 1-3.

Where the remote link is wireless such as a data link established between a data enabled cellular device, the status information can identify a signal strength of the remote link, a data transfer rate of the remote link, as well as position data for the data exchanger. For a data enabled cellular device, the signal strength is a function of the proximity of the data exchanger and a cell tower or other transceiver with which the data exchanger communicates. Improved signal strength can allow for improved data transfer rates. Certain data enabled cellular devices are capable of communicating with a server in the internet to obtain position data. This position data can identify the current geographic location of the data exchanger. The position data can also be used to guide a user from a current position to a desired position. The status information may include such positioning and repositioning data for use in guiding a user from a current location to a desired location. A particular desired location may be a location with improved signal strength for a remote link. This desired location may be simple directional information leading the user closer to one or more cell towers. The desired location may a public location such as a coffee shop, mall, or other place of business strategically positioned near a cell tower for improved signal strength.

Router 40 represents generally any combination of hardware and programming for routing network communication received through client interface 30 to be transmitted by data exchanger 20 to internet 26. Router 40 is also responsible for routing inbound network communications received from internet 26 and directed via client interface 30 to a specified client 12, 14, or 16. Outbound and inbound network communications, for example can be an IP (internet Protocol) packets directed to a target on internet 26 or to a particular network device 12, 14, or 16 on a local area network.

Web server 42 represents generally any combination of hardware and programming capable of serving interfaces such as web pages to clients 12, 14, and 16. Such web pages may include web pages that when displayed by a network device allows a user to provide or otherwise select settings related to the operation of router device 10.

Figure 5:
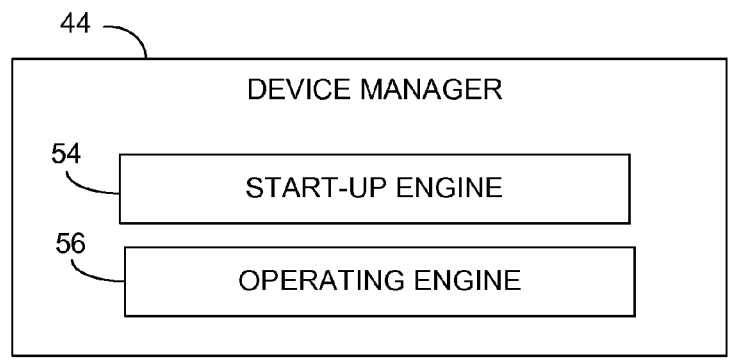
Figure 6:
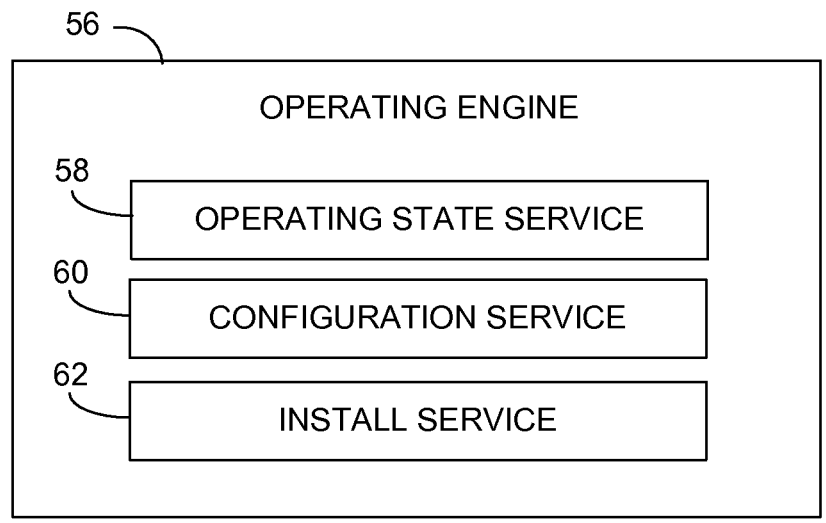

Device manager 44, discussed in more detail below with respect to FIGS. 4-6, represents generally any combination of hardware and programming capable of managing the configuration of router device 10 as well as interacting with a client device to supply status information concerning router device 10, data exchangers being utilized by router device 10 and any remote links established by those data exchangers. One particular task assigned to device manager 44 is providing for the installation of an application on a client. The application is used to obtain status information from device manager 44.

With respect to application installation, device manager 44 is configured to detect the initiation of a link between a client and client interface 30 and to determine an application state. The application state is an indication as to whether or not the application has already been installed on the client. Upon a determination that the application state is not active, device manager 44 provides for the installation of the application, sets the application state to active, and enables router device 10 to perform tasks as guided by the client.

Memory 46 represents generally one or more computer readable mediums capable of storing data that is accessible to device manager 44 and web server 42. As shown memory 46 includes install record 48, install file 50, and instruction file 52. Install record 48 represents generally any data that can be used by device manager 44 to determine the application state. Install file 50 represents generally a program that can be executed by a client to install an application. Instruction file 52 represents generally a script that can be executed by an operating system of a client to cause that client to automatically execute install file 50. For example, device manager 44 can cause router device 10 to appear as a mass storage device when connected to a client. As a result, the operating system of the client parses memory 46, locates and executes instruction file 52 resulting in the installation of the application. Where the operating system is Microsoft® Windows®, instruction file may be referred to as an "autorun" file.

FIG. 5 is a block diagram illustrating physical and logical components of device manager 44. In this example, device manager 44 is shown to include start-up engine 54 and operating engine 56. Start-up engine 54 represents generally any combination of hardware and programming configured to provide for the installation of the application on a client. Start-up engine 54 is discussed in more detail below with respect to FIG. 7. Operating engine 56, discussed in more detail below with respect to FIG. 6, represents generally and combination of programming and hardware configured to manage the operational configuration of router device 10.

Referring now to FIG. 6, operating engine 56 is shown to include operating state service 58, configuration service 60, and install service 62. Operating state service 58 represents generally any combination of hardware and programming configured to detect and report status information concerning router device 10, data exchangers being utilized by router device 10 and any remote links established by those data exchangers.

Operating state service 58 is configured to receive requests for status information from a client device. Referring to FIGS. 1-4, those requests are received via local link 18 established by client interface 30. In response to the request, operating state service 58 is configured to utilize connector 40 to poll one or more data exchangers being utilized by router device 10 via corresponding device links 28 between router device 10 and the data exchangers. Operating state service 58 polls the data exchangers for status information concerning remote links 24, 24', 24" established with a wide area network such as the internet. Operating state service 58 receives the status information via the corresponding device links 28 and then communicates the status information to the requesting client device via local link 18.

Operating state service 58 may communicate the status information via web server 42 (FIG. 4). An application installed on the client device using install file 50 (FIG. 4), when executed may issue the request for the status information. That request is received by web server 42 and passed to operating state service 58. Once the status information is received, operating state service 58 then utilizes web server 42 to return the status information to the application. The Application can then use the status information to inform the user the status of any remote links being used by router device to access a wide area network. For example, the application can inform the user of the strength of the remote links, current transfer data rates, and positioning data.

Configuration service 60 represents generally any combination of hardware and programming configured to generate or otherwise supply one or more configuration web pages to web server 42 to be returned via web server 42 to a requesting client. The configuration pages may include information relating to the operating states detected by operating state manager. The configuration pages may also include controls enabling a user to request changes to the operating state of router device. Such changes are received by web server 42 and implemented by operating state service 58. Install service 62 represents generally any combination of hardware and programming configured to generate or otherwise supply one or more installation pages to web server 42 to be returned to a requesting client. The installation pages when provided to a client, enable the client to download install file 50. The downloading of install file 50 may be manual or automatic. Furthermore, once downloaded, the install file 50 may be manually or automatically executed to install the application.

Figure 7:
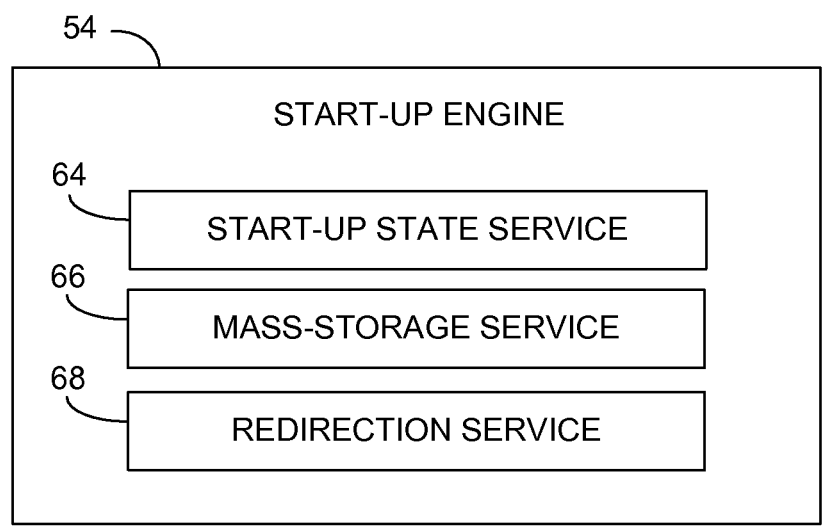

Referring to FIG. 7, start-up engine 54 is shown to include start-up state service 64, mass storage service 66, and redirection service 68. Start-up state service 64 represents generally any combination of hardware and programming configured to detect the initiation of a link between client interface 30 and a client, to determine the application state, and to set or otherwise configure the application state. In particular, upon a determination that the application state is not active, start-up state service 64 is configured to utilize mass-storage service 66 if the detected link is a wired connection or to utilize redirection service 68 if the detected link is a wireless connection.

Mass-storage service 66 represents generally any combination of hardware and programming configured to present router device 10 as a mass-storage device. When presented as a mass storage device with a wired connection to a client, the client can access and utilize memory 46. In particular, the operating system of the client will identify and execute instruction file 52, causing the client to execute installation file 50. Thus, when start-up state service 64 detects the initiation of a wired detection and determines that the application state is not active, start-up state service 64 causes mass-storage service 66 to present router device 10 as a mass-storage device.

Redirection service 68 represents generally any combination of hardware and programming configured to redirect a request from a browser operating on a client to install service 62. When redirected, install service automatically causes or allows a user to download install file 50. Thus, when start-up state service 64 detects the initiation of a wireless detection and determines that the application state is not active, start-up state service 64 causes redirection service 68 to redirect the next or a subsequent browser request to install service 62. For example, a browser operating on the client may request a page from the internet. Instead of routing the request, redirection service 68 causes install service 62 to return a web page that causes or allows a user to download install file 50.

Start-up state service 64 can be configured to detect the application state in a number of manners. As described, install record 48 (FIG. 3) represents generally any data that can be used by device manager 44 to determine the application state. In particular, install record 48 is utilized by start-up state service 64. In one implementation, install record 48 can be a flag that is either set or not set. A set flag, for example, may represent an active application state. When not set, the flag represents an application state that is not active. Thus, upon detecting the initiation of a link between client interface 30 and a client, start-up state service 64 examines install record 48 to determine whether or not the flag is set. If not set, start-up state service 64 determines that the application state is not active and provides for the installation of the application. Subsequently, the start-up state service 64 sets the flag to configure the application state as active. Thus, when the initiation of a link is again detected, start-up state service 64 examines install record 48, identifies that the flag is set, determines that the application state is active, and concludes that, at a minimum, an attempt has already been made to install the application. It is noted that the flag, by default, is not set. It is set only after start-up state service 64 has provided for the installation of the application. It is also noted that router device 10 may include a feature to reset its settings to factory defaults. In such a case, resetting may configure the flag so that it is not set to indicate an application state that is no longer active.

In other implementations, install record 48 may be more complex. For example, install record 64 may include data identifying the client, data identifying the current version of the application, and data identifying the version of that application, if any, that is installed on the client. The data identifying the client may be the client's hardware address, network address, or user credentials used to initiate a link with router device 10. If the current version is newer than the installed version or if there is no installed version, then the application state is not active. Otherwise the application state is active. Thus, upon detecting the initiation of a link between client interface 30 and a client, start-up state service 64 determines if the client is identified in install record 48. If not, the application state is determined to not be active. If the install record 48 identifies the client, start-up state service 64 compares the version of the application, if any, installed on the client with the current version. If no application is installed or if the current version is newer, the application state is determined not to be active. Otherwise, the application state is determined to be active. Upon determining that the application state is not active, start-up state service 64 provides for the installation of the application. Subsequently, start-up state service 64 updates install record 48 to reflect that the current version of the application has been installed on the client. Thus, when the initiation of a link with that same client is again detected, start-up state service 64 examines install record 48, identifies that the installed version is the same as the current version, and determines that the application state is active.

In another implementation, start-up state service 64 may be configured to determine the application state by querying the client connecting to client interface 30. In doing so, start-up state service 64 determines if the current version of the application is installed on the client. If so, the application state is active, otherwise, it is not.

As discussed, install file 50 (FIG. 3) represents generally a program that can be executed by a client to install an application. Install file 50 can take a number of forms. For example, install file 50 may be a self contained executable. Install file 50, when executed, may cause the client to access the internet and download and install the application. Install file 50 may be executable by a browser operating on the client to install the application in the form of a browser extension. That extension may be installed by install file 50, or install file 50 may cause the browser to download and install the extension.

Start-up state service 64 may periodically communicate via internet 26 to identify the current version of the application. Where install file 50 is a self contained executable and the current version is newer than the version stored in memory 46, start-up state service 64 downloads and stores the current version in memory 46 and updates install record 48 to reflect the current version. Where install record 48 is a flag, that flag is configured to reflect an application state that is not active. In other implementations, install record 48 is updated to identify the current application version. Where install file 50 is configured to download and install the application from internet 26, start-up state service 64 may, upon detection of the availability of a new version, update install record 48 to identify that that new version. In this manner, new application versions are installed on the client as they become available.

Figure 8:
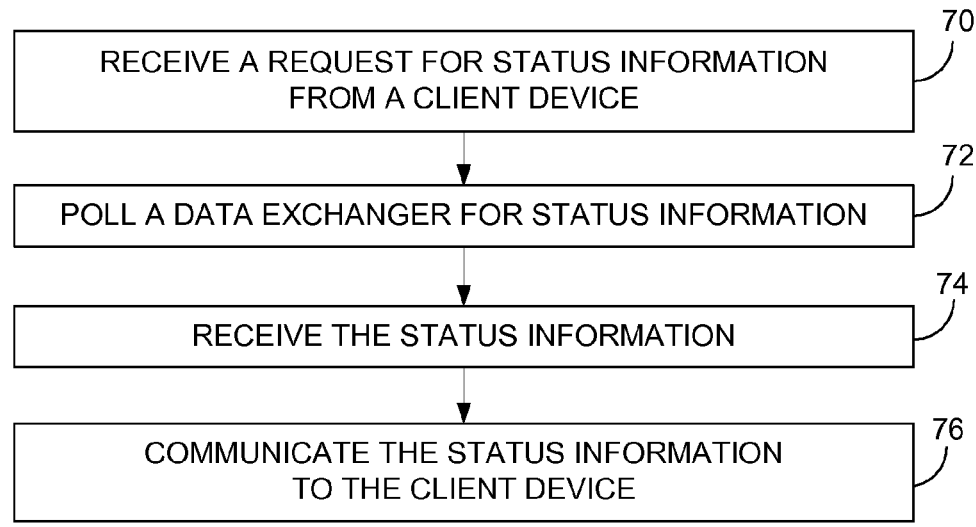
FIG. 8-9 are exemplary flow diagrams illustrating steps taken in performance of various embodiments of the present invention.
Figure 9:
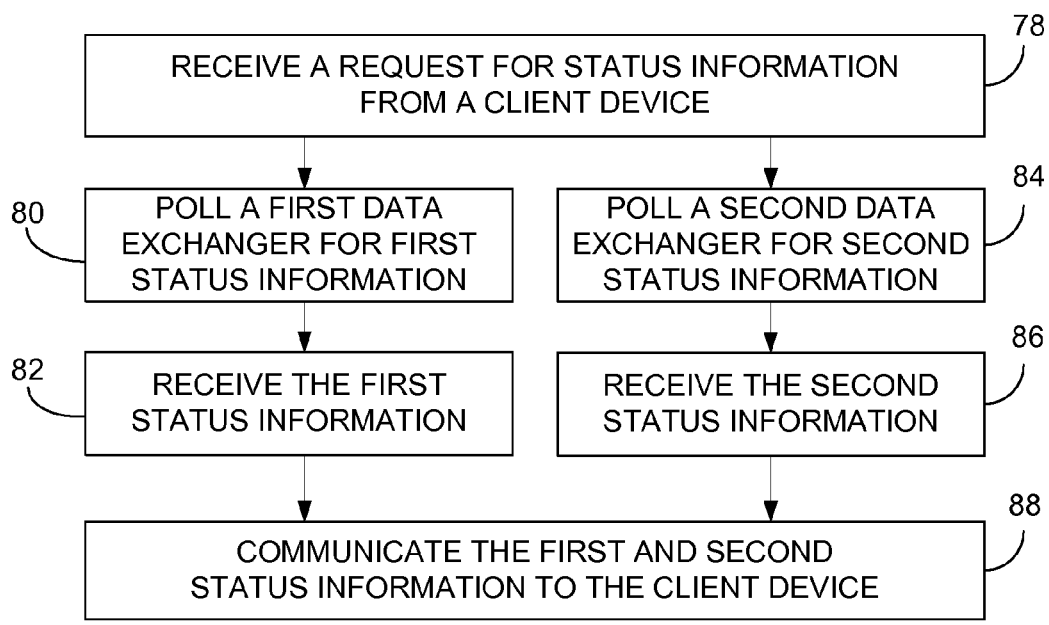

OPERATION: The operation of embodiments of the present invention will now be described with reference to FIGS. 8-9. FIG. 8 is an exemplary flow diagram that helps illustrate actions taken to provide a client device with status information concerning a remote link with a WAN established for a router device by a data exchanger. FIG. 9 is an exemplary flow diagram that helps illustrate actions taken to provide a client device with status data for multiple remote links established with a WAN for a router device by multiple data exchangers.

Starting with FIG. 8, a request for status information is received from a client device with a first link (step 70). The first link is a data link between the client device and a router device. In response to the request, a data exchanger being utilized by the router device is polled, via a second link, for status information (step 72). The second link is a data link between the router device and the data exchanger. The status information identifies a state of third connection serving as a data link between the data exchanger and a wide area network. The status information is received via the second link (step 74). The status information is then communicated to the client device via the first connection (step 76).

Comparing environment 1 of FIG. 1 with the method Charted in FIG. 8, local link 18 is the first link. Device link 28 is the second link, and remote link 24 is the third link. The request for status data may originate from an application installed on the client device. Thus, while not illustrated, the method charted in FIG. 8 may include providing for the installation of the application on the client device from the router device. Further, step 70 may involve receiving the request for status information from that application once installed on the client device.

Moving on to FIG. 9, a request for status information is received from a client device with a first link (step 78). The first link is a data link between the client device and a router device. The router device is configured to utilize multiple data exchangers. In the example of FIG. 9, the router device is configured to utilize a first data exchanger and a second data exchanger. The first data exchanger is polled, via a second link, for first status information in response to the request received in step 78 (step 80). The second link is a data link between the router device and the first data exchanger. The first status information identifies a state of a third connection serving as a data link between the first data exchanger and a wide area network. The first status information is received via the second link (step 82).

Also in response to the request received in step 78, the second data exchanger is polled for second status information via a fourth link (step 84). The fourth link is a data link between the router device and the second data exchanger. The second status information identifies a state of a fifth link serving as a data link between the second data exchanger and the wide area network. The second status information is received via the fourth link (step 86). The first and second status information is then communicated to the client device via the first link (step 88).

Comparing environment 3 of FIG. 3 with the method Charted in FIG. 9, local link 18 is the first connection. Device links (not shown) connecting router device 10" to data exchangers 20' and 20" serve as the second and fourth links. Remote links 24' and 24" serve as the third and fifth links.

With respect to FIGS. 8 and 9, where a given data exchanger is a data enabled cellular communication device the third and fifth links are cellular data links. Polling for status information in steps 72, 80, and 84 may involve polling for one or more of a signal strength of the cellular data link, a data transfer rate of that link, as well as position data for the particular data exchanger. Polling for status information in steps 72, 80, and 84 can also involve polling for repositioning data that indicates a direction or a location for repositioning the given data exchanger to realize improved signal strength of the cellular data link.

Figure 10:
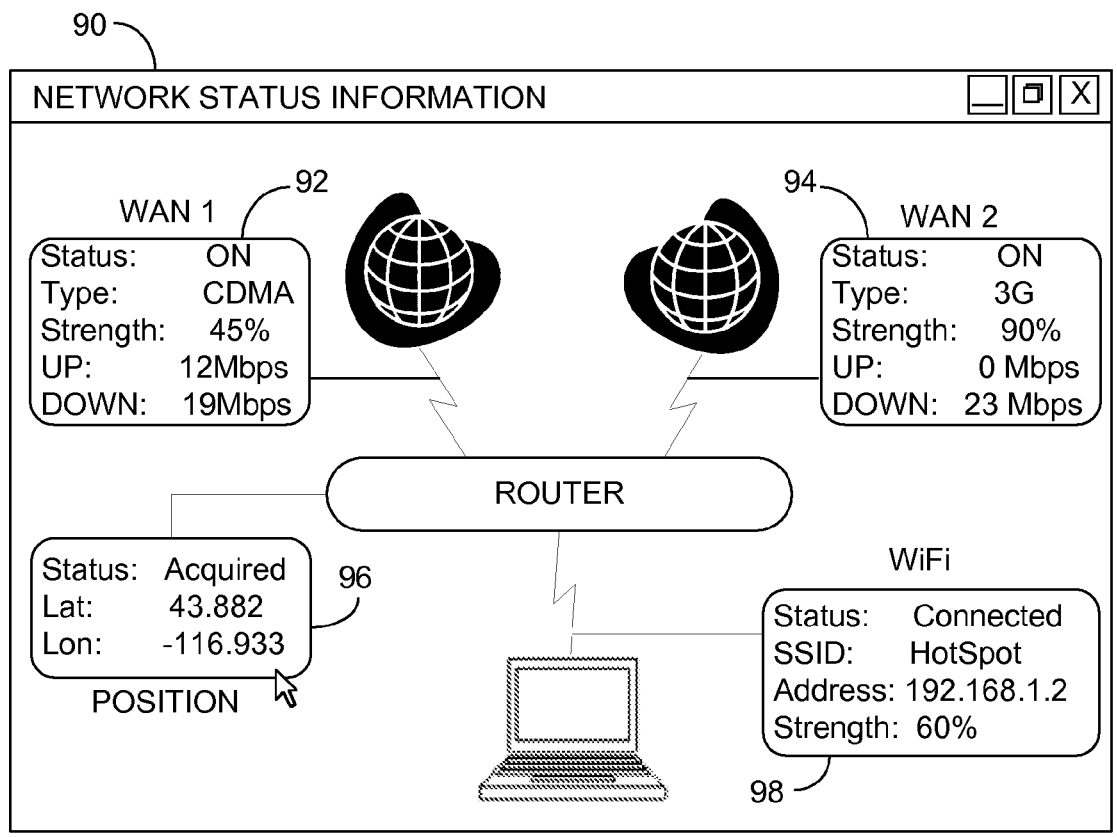
FIGS. 10-11 are exemplary screen views of status information being displayed by a client device according to an embodiment of the present invention.
Figure 11:
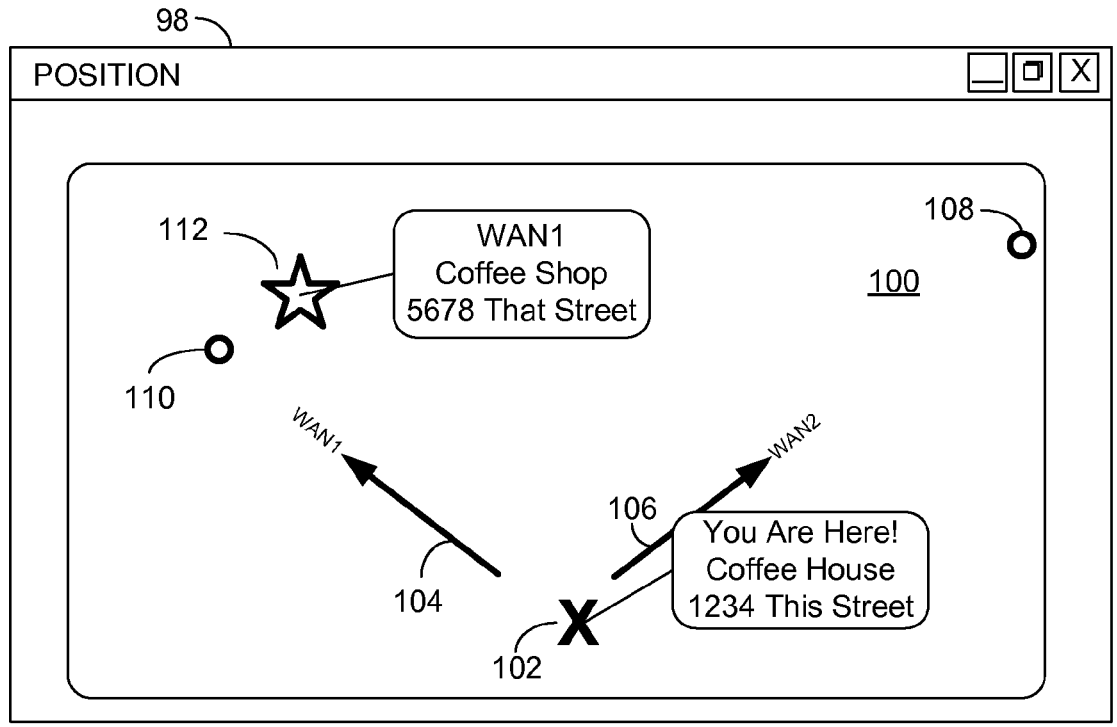

EXAMPLES: FIGS. 10-11 are exemplary screen views of status information being displayed by an application on a client device according to an embodiment of the present invention. Starting with FIG. 10 screen view 90, labeled "NETWORK STATUS INFORMATION," is shown. Screen view 90 includes various information sections 92-98. In addition to providing textual and visual information, each section 92-98 may also serve as an interface control that when selected like a button or link causes the application to display another screen or take some other action. Screen 90 displays sections 92 and 94 to provide the user status information regarding each of two remote links between the router device and a wide area network such as the internet. Such presumes that the router device is configured to utilize two data exchangers. Section 96 displays position data for one or both of those data exchangers while section 98 informs the user of the status of the local link between the client device and the router device.

Upon the user's selection of section 96 in FIG. 10, the application displays screen 98 seen in FIG. 11. Using position data, screen 98 displays a map showing the user's current location 102. Using repositioning data, the application displays directional arrows indicating a directions for moving closer to cell phone towers 108 and 110 respectively. It is presumed that moving closer to a given cell tower will result in improved signal strength for the data link between a given data exchanger and the wide area network. Using repositioning data, the application also shows a location 112 of a public facility that is located nearer to cell tower 110. Repositioning to location 112 should result in an improved signal strength for the data link while providing a potentially convenient work location.

CONCLUSION: The schematic diagrams of FIGS. 1-3 illustrate exemplary environments in which embodiments of the present invention may be implemented. Implementation, however, is not limited to these environments. The diagrams of FIGS. 4-7 show the architecture, functionality, and operation of various embodiments of the present invention. A number of the blocks are defined as programs. Each of those blocks may represent in whole or in part a module, segment, or portion of code that comprises one or more executable instructions to implement the specified logical function(s). Each block may also represent in whole or in part a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 8-9 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention.

What is claimed is:

1. A method for communicating network status information, comprising:
   receiving, via a first link, a request for status information from a client device, the first link being a data link between a router device and a client device;
   in response to the request, polling a data exchanger for status information via a second link between the router device and the data exchanger, the status information identifying a state of a third link between the data exchanger and a wide area network, and
   wherein the data exchanger is a data enabled cellular communication device and the third link is a cellular data link and wherein polling the data exchanger for status information comprises polling the data exchanger for repositioning data for the data exchanger, the repositioning data indicating one or more of a direction or location for repositioning the data exchanger to realize an improved signal strength of the cellular data link;
   receiving the status information via the second link; and
   communicating the status information to the client device via the first link.

2. The method of claim 1, wherein the data exchanger is a first data exchanger and the status information is first status information, the method further comprising:
   in response to the request, polling a second data exchanger for second status information via a fourth link between the router device and the second data exchanger, the second status information identifying a state of a fifth link between the second data exchanger and the wide area network;
   receiving the second status information via the fourth link; and
   communicating the second status information to the client device via the first link.

3. The method of claim 1, wherein the data exchanger is a data enabled cellular communication device and the third link is a cellular data link, wherein polling the data exchanger for status information comprises polling the data exchanger for one or more of a signal strength of the cellular data link, a data transfer rate of the cellular data link, and position data for the data exchanger.

4. The method of claim 1, further comprising providing for installation of an application on the client device from the router device and wherein receiving comprises receiving the request for status information from the application and communicating comprises communicating the status information to the application.

5. A non-transitory computer readable medium having instructions that when executed cause a router device to implement a method, the medium including instructions for:
   receiving, via a first link, a request for status information from a client device, the first link being a data link between a router device and a client device;
   in response to the request, polling a data exchanger for status information via a second link between the router device and the data exchanger, the status information identifying a state of a third link between the data exchanger and a wide area network;

receiving the status information via the second link;
communicating the status information to the client device via the first link; and
providing for installation of an application on the client device from the router device and wherein the instructions for receiving include instructions for receiving the request for status information from the application and the instructions for communicating comprise instructions for communicating the status information to the application.

6. The medium of claim 5, wherein the data exchanger is a first data exchanger and the status information is first status information, the medium having further instructions for:
in response to the request, polling a second data exchanger for second status information via a fourth link between the router device and the second data exchanger, the second status information identifying a state of a fifth link between the second data exchanger and the wide area network;
receiving the second status information via the fourth link; and
communicating the second status information to the client device via the first link.

7. The medium of claim 5, wherein the data exchanger is a data enabled cellular communication device and the third link is a cellular data link, wherein the instructions for polling the data exchanger for status information include instructions for polling the data exchanger for one or more of a signal strength of the cellular data link, a data transfer rate of the cellular data link, and position data for the data exchanger.

8. The medium of claim 5, wherein the data exchanger is a data enabled cellular communication device and the third link is a cellular data link and wherein the instructions for polling the data exchanger for status information include instructions for polling the data exchanger for repositioning data for the data exchanger, the repositioning data indicating one or more of a direction or location for repositioning the data exchanger to realize an improved signal strength of the cellular data link.

9. A router device comprising a client interface, a data exchanger interface, a router and an operating state service, wherein:
the client interface is configured to function as a communication interface between the router device and a client device;
the data exchanger interface is configured to function as a communication interface between the router device and a data exchanger capable of establishing a data link with a wide area network;
the router is configured to utilize the client interface and the data exchanger interface to route data communications between the client device and the wide area network via data exchanger; and
the operating state service is configured to:
receive, via the client interface, a request for status information from the client device;
in response to the request, poll the data exchanger for status information via the data exchanger interface, the status information identifying a state of the data link with the wide area network;
receive the status information via the data exchanger interface; and
communicate the status information to the client device via the client interface,
wherein the data exchanger is a data enabled cellular communication device and the data link is a cellular data link and wherein the operating state service is configured to poll the data exchanger for status information in the form of repositioning data for the data exchanger, the repositioning data indicating one or more of a direction or location for repositioning the data exchanger to realize an improved signal strength of the cellular data link.

10. The router device of claim 9, wherein the data exchanger interface is a first data exchanger interface, the data exchanger is a first data exchanger, the data link is a first data link and the status information is first status information, the router device further comprising a second data exchanger interface configured to function as a communication interface between the router device and a second data exchanger capable of establishing a second data link with the wide area network and wherein the operating state service is further configured to:
in response to the request, poll the second data exchanger for second status information via the second data exchanger interface, the second status information identifying a state of the second data link with the wide area network;
receive the second status information via the second data exchanger interface; and
communicate the second status information to the client device via the client interface.

11. The router device of claim 9, wherein the data exchanger is a data enabled cellular communication device and the data link is a cellular data link, wherein the operating state service is operable to poll the data exchanger for status information in the form of one or more of a signal strength of the cellular data link, a data transfer rate of the cellular data link, and position data for the data exchanger.

12. The router device of claim 9, wherein the operating state service is configured to provide for installation of an application on the client device from the router device and wherein the operating state service is configured to receive the request for status information from the application and to communicate the status information to the application.

13. A non-transitory computer readable medium having instructions that when executed cause a router device to implement a method, the medium including instructions for:
receiving, via a first link, a request for status information from a client device, the first link being a data link between a router device and a client device;
in response to the request, polling a data exchanger for status information via a second link between the router device and the data exchanger, the status information identifying a state of a third link between the data exchanger and a wide area network;
receiving the status information via the second link;
communicating the status information to the client device via the first link; and
wherein the data exchanger is a data enabled cellular communication device and the third link is a cellular data link and wherein the instructions for polling the data exchanger for status information include instructions for polling the data exchanger for repositioning data for the data exchanger, the repositioning data indicating one or more of a direction or location for repositioning the data exchanger to realize an improved signal strength of the cellular data link.

14. A method for communicating network status information, comprising:
receiving, via a first link, a request for status information from a client device, the first link being a data link between a router device and a client device;
in response to the request, polling a data exchanger for status information via a second link between the router device and the data exchanger, the status information identifying a state of a third link between the data exchanger and a wide area network;

receiving the status information via the second link;

communicating the status information to the client device via the first link; and providing for installation of an application on the client device from the router device and wherein receiving the request for status information comprises receiving the request for status information from the application and communicating comprises communicating the status information to the application.

15. A router device comprising a client interface, a data exchanger interface, a router and an operating state service, wherein:

the client interface is configured to function as a communication interface between the router device and a client device;

the data exchanger interface is configured to function as a communication interface between the router device and a data exchanger capable of establishing a data link with a wide area network;

the router is configured to utilize the client interface and the data exchanger interface to route data communications between the client device and the wide area network via data exchanger; and the operating state service is configured to:

receive, via the client interface, a request for status information from the client device;

in response to the request, poll the data exchanger for status information via the data exchanger interface, the status information identifying a state of the data link with the wide area network;

receive the status information via the data exchanger interface; and communicate the status information to the client device via the client interface, and wherein the operating state service is configured to provide for installation of an application on the client device from the router device and wherein the operating state service is configured to receive the request for status information from the application and to communicate the status information to the application.

* * * * *